(12) United States Patent
Sugawara

(10) Patent No.: US 11,930,150 B2
(45) Date of Patent: Mar. 12, 2024

(54) SCANNING SYSTEM AND CONTROL METHOD THEREFOR

(71) Applicant: CANON KABUSHIKI KAISHA, Tokyo (JP)

(72) Inventor: Kazuhiro Sugawara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/064,195

(22) Filed: Dec. 9, 2022

(65) Prior Publication Data

US 2023/0188664 A1 Jun. 15, 2023

(30) Foreign Application Priority Data

Dec. 14, 2021 (JP) ................................. 2021-202186

(51) Int. Cl.
*H04N 1/44* (2006.01)
*H04N 1/00* (2006.01)

(52) U.S. Cl.
CPC ....... *H04N 1/4406* (2013.01); *H04N 1/00209* (2013.01); *H04N 1/00244* (2013.01)

(58) Field of Classification Search
None
See application file for complete search history.

(56) References Cited

U.S. PATENT DOCUMENTS

| 10,223,048 | B2 * | 3/2019 | Tonegawa | H04L 63/0428 |
| 2014/0355034 | A1 * | 12/2014 | Mihara | G06F 3/1222 |
| | | | | 358/1.14 |
| 2019/0286811 | A1 * | 9/2019 | Okumura | G06F 21/45 |

FOREIGN PATENT DOCUMENTS

JP 2019161445 A 9/2019

* cited by examiner

*Primary Examiner* — Dov Popovici
(74) *Attorney, Agent, or Firm* — Canon U.S.A., Inc. IP Division

(57) ABSTRACT

A control method for a scanning system that reduces load on an information processing apparatus when transmitting scanned data to a cloud server requiring an access token is provided. The control method includes acquiring, by an information processing apparatus, an access token from an authorization server, transmitting, by the information processing apparatus, the access token and an address of a cloud server in a first transmission, receiving, by an image forming apparatus, the address and the access token transmitted in the first transmission, scanning, by the image forming apparatus, a document based on the reception of the address and the access token, and transmitting, by the image forming apparatus, the image data generated by scanning the document and the access token to the cloud server in a second transmission.

10 Claims, 13 Drawing Sheets

SCANNING SYSTEM AND CONTROL METHOD THEREFOR

BACKGROUND

Field of the Disclosure

The present disclosure relates to a scanning system and a control method for the scanning system.

Description of the Related Art

An information processing system in which an information processing apparatus and an image forming apparatus including a scanning function are used to transmit scanned data (image data) obtained by scanning a document using the image forming apparatus to an external cloud server has heretofore been known (see Japanese Patent Application Laid-Open No. 2019-161445).

Japanese Patent Application Laid-Open No. 2019-161445 discusses the information processing system in which the information processing apparatus receives scanned data from the image forming apparatus, receives an access token from the cloud server, and transmits the received scanned data and access token to the cloud server.

However, the scanned data obtained by scanning a document using the image forming apparatus needs to be stored in the information processing apparatus, and thus there is a need for a storage area to store the scanned data in the storage of the information processing apparatus. The scanned data is temporarily stored in the information processing apparatus and is then transmitted to the cloud server, which requires time for transmission of the scanned data from the image forming apparatus to the information processing apparatus.

SUMMARY

According to embodiments of the present disclosure, a scanning system including an information processing apparatus, an image forming apparatus configured to generate image data by scanning a document, an authorization server configured to issue an access token to access a cloud server, and a cloud server configured to provide a cloud service, wherein the information processing apparatus includes an acquisition unit configured to acquire the access token from the authorization server, and a first transmission unit configured to transmit the access token and an address of the cloud server to the image forming apparatus, and wherein the image forming apparatus includes a reception unit configured to receive the address and the access token transmitted from the first transmission unit, a scanning unit configured to scan a document based on the reception of the address and the access token by the reception unit, and a second transmission unit configured to transmit the access token and image data generated by scanning the document by the scanning unit to the cloud server.

Further features of the present disclosure will become apparent from the following description of exemplary embodiments with reference to the attached drawings.

DESCRIPTION OF THE EMBODIMENTS

Exemplary embodiments of the present disclosure will be described with reference to the drawings. Components described in the following exemplary embodiments are by way of example only, and are not intended to limit the scope of the present disclosure.

An exemplary embodiment of the present disclosure illustrates an information processing apparatus, an image forming apparatus, and a cloud server as an example of a scanning system, and also illustrates a method for issuing a scan instruction from the information processing apparatus to the image forming apparatus and transmitting the scanned data to the cloud server will be described.

A first exemplary embodiment will now be described with reference to FIGS. 1 to 8.

<System Configuration>

Figure 1:
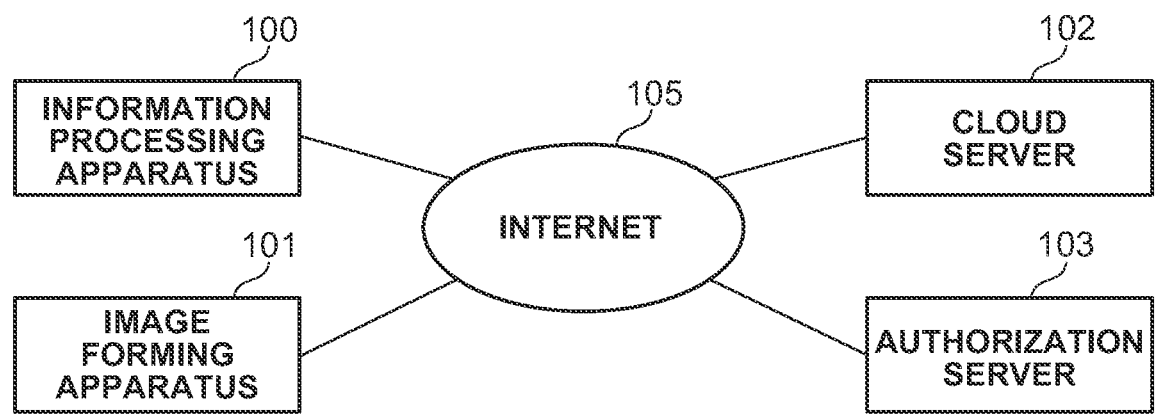
FIG. 1 illustrates a configuration example of a system according to a first exemplary embodiment.

FIG. 1 illustrates a configuration example of a system according to the first exemplary embodiment. The system according to the first exemplary embodiment includes an information processing apparatus 100, an image forming apparatus 101, the Internet 105, a cloud server 102, and an authorization server 103. The image forming apparatus 101 is an example of an image processing apparatus. The cloud server 102 and the authorization server 103 can communicate with the information processing apparatus 100 and the image forming apparatus 101 via the Internet 105. The cloud server 102 provides a cloud service. The information processing apparatus 100 and the image forming apparatus 101 can communicate with each other via a network (wired local area network (LAN) or wireless LAN). The cloud server 102 corresponds to a resource server defined in OAuth 2.0 (RFC 6749). The authorization server 103 corresponds to an authorization server defined in OAuth 2.0. An application and program to run on the information processing apparatus 100 and the image forming apparatus 101 correspond to a client defined in OAuth 2.0.

<Hardware Configuration of Information Processing Apparatus>

Figure 2:
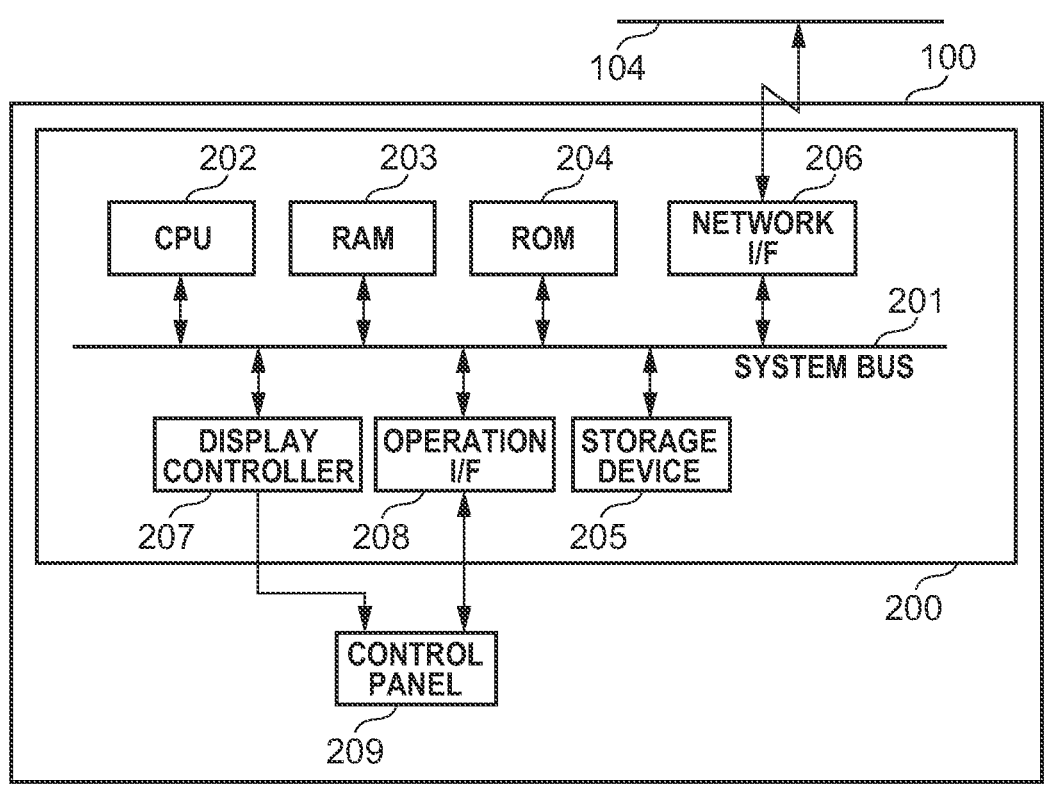
FIG. 2 is a block diagram illustrating a hardware configuration example of an information processing apparatus according to the first exemplary embodiment.

FIG. 2 is a bock diagram illustrating a hardware configuration example of the information processing apparatus 100 according to the first exemplary embodiment and devices incorporated in the information processing apparatus 100.

A controller unit 200 includes a central processing unit (CPU) 202, a random access memory (RAM) 203, a read-only memory (ROM) 204, a storage device 205, a network interface (I/F) 206, a display controller 207, and an operation I/F 208, each of which is connected to a system bus 201. The display controller 207 and the operation I/F 208 are each connected to a control panel 209 to control buttons on a panel by a user and control updating of a screen display on the control panel 209. While FIG. 2 illustrates a touch panel by way of example to illustrate an example of a screen transition of the control panel 209 according to the present exemplary embodiment, the control panel to be used is not limited to this example.

The CPU 202 is a central processing unit that controls the overall operation of the controller unit 200. The RAM 203 is a volatile memory. The ROM 204 is a non-volatile memory and stores boot programs for the CPU 202. The storage device 205 is a storage device (e.g., a hard disk drive (HDD) or a solid-state drive (SSD)) having a larger capacity than the RAM 203. The storage device 205 stores control programs, applications, and various data. Upon start-up of the information processing apparatus 100, the CPU 202 executes a boot program stored in the ROM 204. This boot program is used to read out a control program stored in the storage device 205 and load the control program into the RAM 203. After executing the boot program, the CPU 202 executes the control program loaded into the RAM 203 and performs control processing. Further, the CPU 202 stores data to be used during execution of the control program into the RAM 203, and reads and writes the data. In addition, various settings required to execute the control program can also be stored in the storage device 205. The various settings can be read and written by the CPU 202. The CPU 202 communicates with other apparatuses on a network 104 via the network I/F 206, and also communicates with the cloud server 102 on the Internet 105 via a gateway.

The display controller 207 controls the screen display on the touch panel of the connected control panel 209 in response to an instruction from the CPU 202.

The operation I/F 208 is configured to input and output operation signals from the control panel 209.

When the touch panel of the control panel 209 is pressed, the CPU 202 acquires coordinates indicating the pressed position on the touch panel via the operation I/F 208.

<Hardware Configuration of Image Forming Apparatus>

Figure 3:
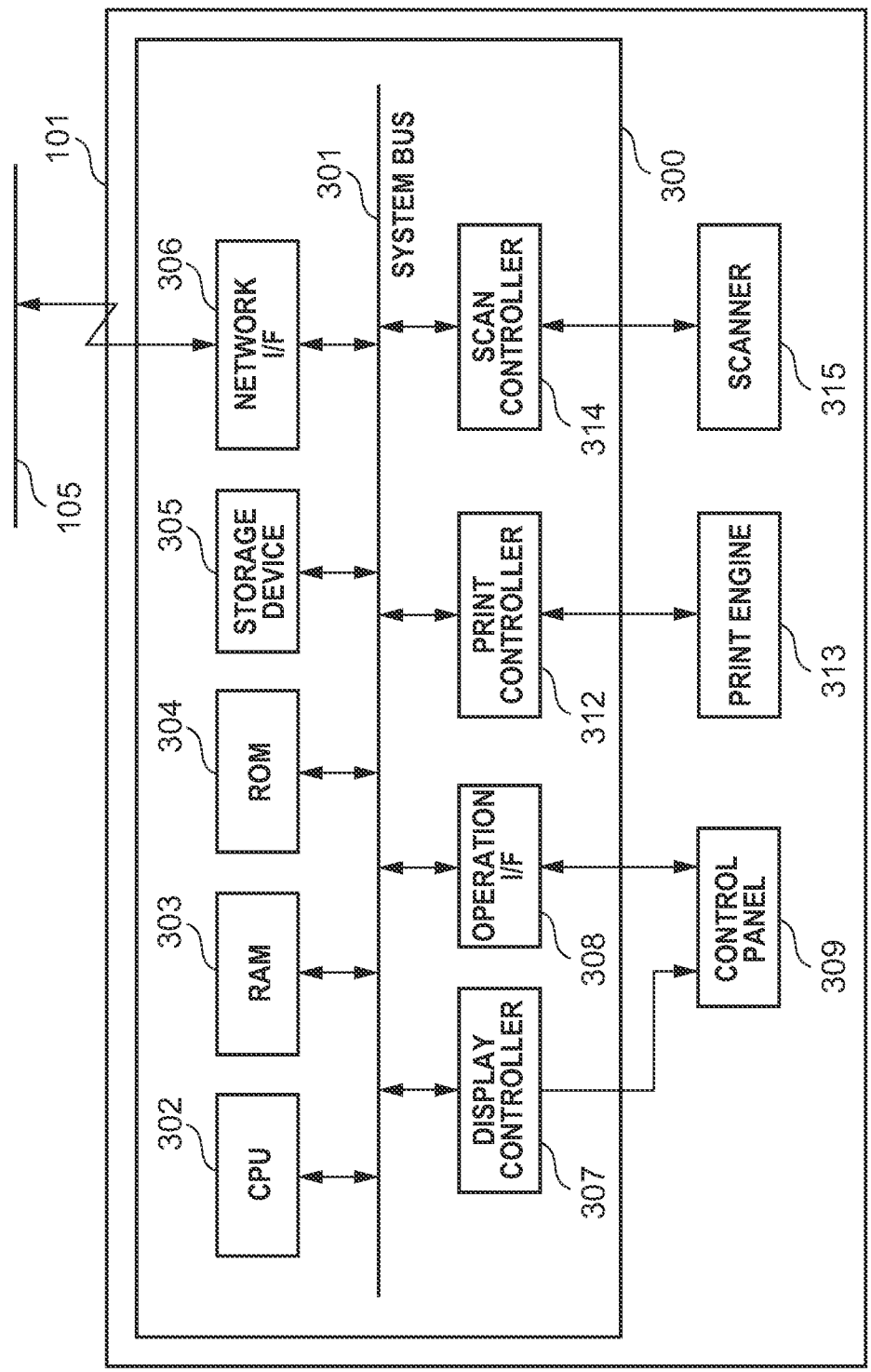
FIG. 3 is a block diagram illustrating a hardware configuration example of an image forming apparatus according to the first exemplary embodiment.

FIG. 3 is a block diagram illustrating a hardware configuration example of a controller unit 300 of the image forming apparatus 101 and devices incorporated in the image forming apparatus 101.

In the controller unit 300, a CPU 302, a RAM 303, a ROM 304, and a storage device 305 are directly connected to a system bus 301. The controller unit 300 is also connected to external devices through a network I/F 306, a display controller 307, an operation I/F 308, a print controller 312, and a scan controller 314. These components are each connected to the system bus 301, and thus can communicate with each other.

The CPU 302 is a central processing unit that controls the overall operation of the controller unit 300. The RAM 303 is a volatile memory. The ROM 304 is a non-volatile memory and stores boot programs for the CPU 302. The storage device 305 is a storage device (e.g., a HDD) having a larger capacity than the RAM 303. The storage device 305 stores control programs for the image forming apparatus 101 to be executed by the CPU 302. The storage device 305 may be replaced with another storage device, such as an SSD, that includes a function equivalent to the HDD.

Upon start-up, for example, upon power-on, the CPU 302 executes a boot program stored in the ROM 304. This boot program is used to read out a control program stored in the storage device 305 and load the control program into the RAM 303. After executing the boot program, the CPU 302 executes the control program loaded into the RAM 303 and performs control processing. Further, the CPU 302 stores data to be used during execution of the control program into the RAM 303, and reads and writes the data. The storage device 305 can also store various settings required to execute the control program and image data obtained by scanning a document using a scanner 315. The various settings and data can be read and written by the CPU 302. The CPU 302 communicates with other apparatuses on the network 104 via the network I/F 306, and also communicates with the cloud server 102 on the Internet 105 via a gateway.

The display controller 307 controls the screen display on the touch panel of a connected control panel 509 in response to an instruction from the CPU 302.

The operation I/F 308 is configured to input and output operation signals. The operation I/F 308 is connected to the control panel 509. When the touch panel is pressed, the CPU 302 acquires coordinates indicating the pressed position on the touch panel via the operation I/F 308.

The print controller 312 transmits control commands and image data to a connected print engine 313 in response to an instruction from the CPU 302.

The print engine 313 prints the received image data on a sheet according to a control command received from the print controller 312. A more detailed description of the print engine 313 according to the present exemplary embodiment is herein omitted.

The scan controller 314 transmits the control command to the connected scanner 315 in response to an instruction from the CPU 302, and writes the image data received from the scanner 315 into the RAM 303.

The scanner 315 uses an optical unit to scan a document placed on a platen glass (not illustrated) included in the image forming apparatus 101, or a document placed on an auto document feeder (ADF), according to the control command received from the scan controller 314. The scanning operation by the scanner 315 is switched by controlling the scan controller 314 to scan the document placed on the platen glass or the document placed on the ADF based on a scan source setting 621. In the case of scanning the document placed on the ADF, the scanner 315 controls scanning by switching the document scanning method between double-sided control and one-sided control based on a double-sided/one-sided setting 622. An instruction indicating the size of the document to be scanned is transmitted to the scan controller 314 based on a scan document size setting 624 and the document is scanned by the scanner 315. Data obtained by scanning the document using the scanner 315 is stored as image data in the RAM 303. The image data is converted into a file format, such as a portable document format (PDF), a Joint Photographic Experts Group (JPEG) format, a tag image file format (TIFF) format, based on a file format setting 623.

As described above, scan processing in a scanning system according to the present exemplary embodiment and processing of transmitting an image file to the cloud server 102 are implemented with the hardware configuration of the image forming apparatus 101.

<Flow of Data in System According to First Exemplary Embodiment>

Figure 4:
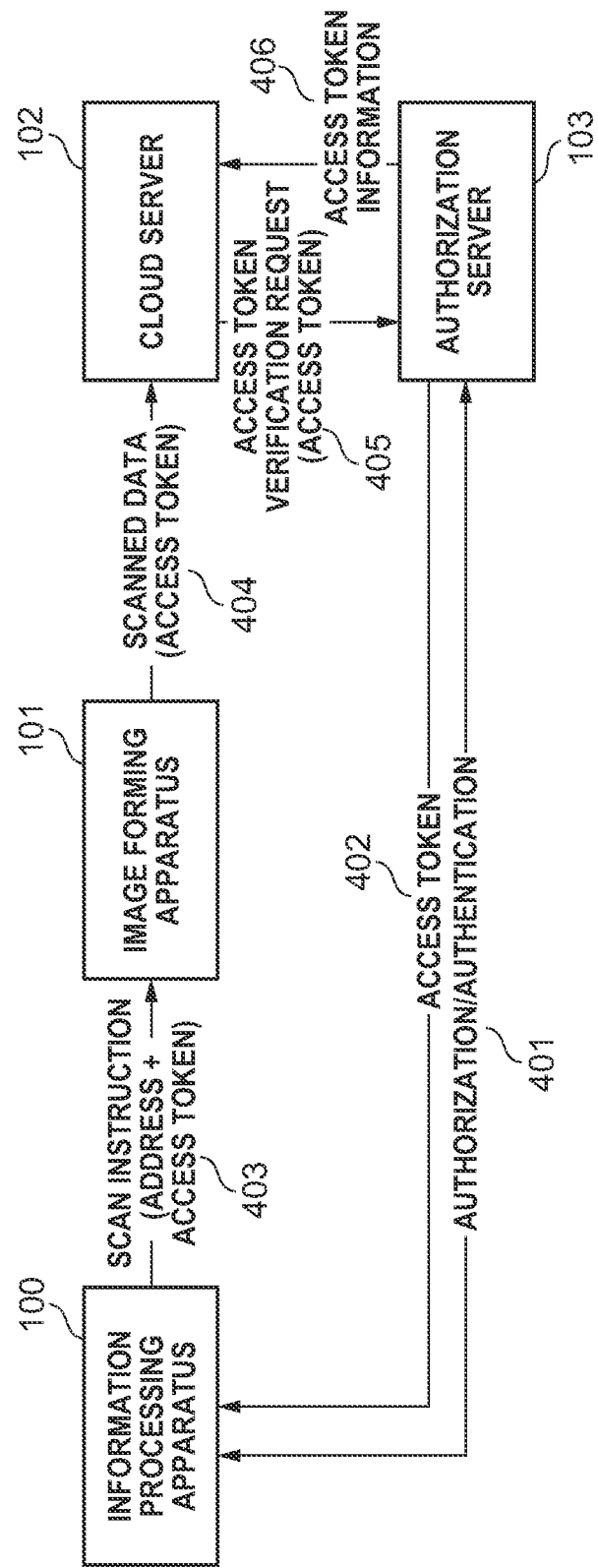
FIG. 4 illustrates a flow of data in the system according to the first exemplary embodiment.

FIG. 4 illustrates a flow of data among the apparatuses constituting the system according to the first exemplary embodiment.

The user starts scanning using the image forming apparatus 101 by setting the cloud server 102 as a destination from a scan application of the information processing apparatus 100. In this case, the information processing apparatus 100 transmits an authorization/authentication 401 to the authorization server 103 from the information processing apparatus 100 before scanning is executed. The authorization/authentication 401 indicates processing of transmitting an authorization request and user authentication information input on an authorization screen received based on the authorization request to the authorization server 103. This processing will be described in detail with reference to a sequence diagram of FIG. 5. The authorization server 103 processes the authorization/authentication 401 to issue an access token 402 to allow the scan application to access the cloud server 102, and transmits the access token 402 to the information processing apparatus 100. Upon receiving the access token 402, the information processing apparatus 100 transmits a scan instruction 403 to the image forming apparatus 101.

The scan instruction 403 includes the access token 402 and a uniform resource identifier (URI) indicating an address of the cloud server 102. A plurality of addresses can also be designated in the scan instruction 403. In this case, the authorization/authentication 401 is executed for each address and an access token for each address is acquired. The scan instruction 403 including a set of the acquired access token and the corresponding address is transmitted to the image forming apparatus 101. The present exemplary embodiment illustrates a case where only the cloud server 102 is set as a destination.

When the image forming apparatus 101 receives the scan instruction 403, the scanner 315 scans a document and generates scanned data 404 including image data. The image forming apparatus 101 transmits the scanned data 404 to which the access token 402 is added to the cloud server 102.

The cloud server 102 transmits an access token verification request 405 including the access token 402 to the authorization server 103 to verify the access token 402 included in the scanned data 404.

Upon receiving the access token verification request 405, the authorization server 103 verifies whether the access token 402 is already issued. If the access token 402 is already issued, the expiration period for the access token 402 is verified. If the access token 402 has not expired and is valid, the access token 402 is stored in access token information 406 to be transmitted to the cloud server 102.

Upon receiving the access token information 406, the cloud server 102 determines that the access token 402 for the scanned data 404 is valid. If the access token 402 is valid, the received image data is stored in the designated address.

A flow of data when the scanning system according to the first exemplary embodiment issues an instruction from the information processing apparatus 100 to the image forming apparatus 101, transmits the scanned data 404 to the cloud server 102, and stores the scanned data 404 is described above.

<Sequence Diagram of System according to First Exemplary Embodiment>

Figure 5:
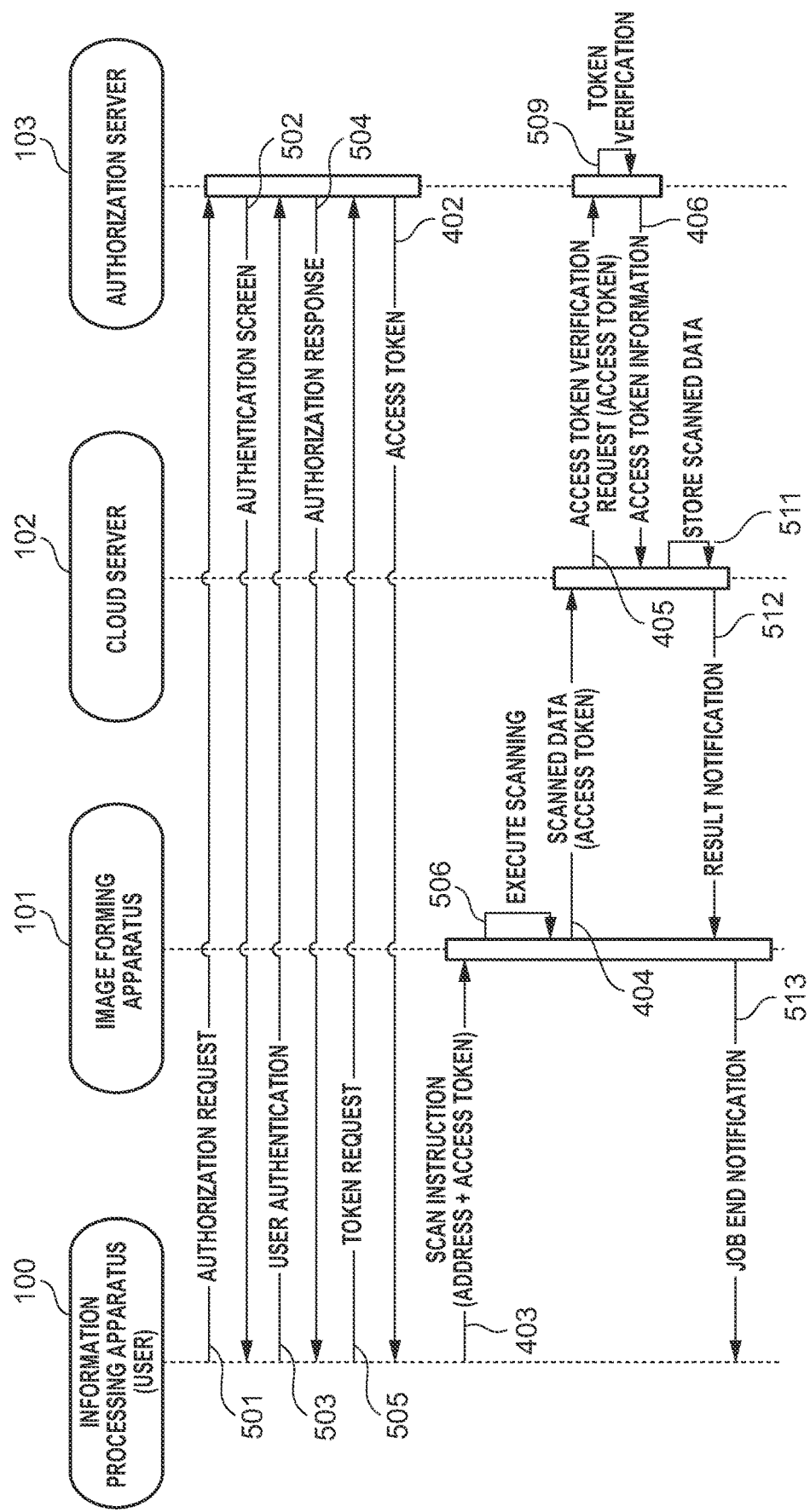
FIG. 5 is a sequence diagram of the system according to the first exemplary embodiment.

FIG. 5 is a sequence diagram of the scanning system according to the first exemplary embodiment.

The scanning system according to the first exemplary embodiment activates an application in the information processing apparatus 100, selects the image forming apparatus 101 to designate the cloud server 102 as a destination, and starts the following sequence when scanning is started.

The information processing apparatus 100 transmits an authorization request 501 to the authorization server 103 so that the application running on the information processing apparatus 100 can obtain an access authorization to the cloud server 102.

The authorization server 103 determines the received authorization request, and transmits a URI to display an authentication screen 502 to the information processing apparatus 100. The information processing apparatus 100 displays the authentication screen 502 on a browser of the information processing apparatus 100. When the user inputs authentication information, the information processing apparatus 100 transmits the authentication information to the authorization server 103 as a request for user authentication 503. The authorization server 103 determines whether the authentication information about the user authentication 503 matches authentication information registered in advance. If it is determined that the authentication information matches the preliminarily registered authentication information, the authentication is successful. If it is determined that the authentication information does not match the preliminarily registered authentication information, the authentication is unsuccessful. If the authentication is successful, the access token 402 is transmitted to the information processing apparatus 100.

Upon receiving the access token 402, the information processing apparatus 100 transmits the scan instruction 403 including the address designated on the application of the information processing apparatus 100 and the access token 402 to the image forming apparatus 101.

Upon receiving the scan instruction 403, the image forming apparatus 101 executes document scanning 506 using the scanner 315 and generates scanned data, and then transmits the access token and the scanned data 404 to the cloud server 102.

Upon receiving the scanned data 404, the cloud server 102 transmits the access token verification request 405 including the access token to the authorization server 103 to verify the access token for the scanned data 404. The authorization server 103 determines whether the access token included in the received access token verification request 405 is issued. If it is determined that the access token is issued, the expiration period and the expired state are checked by token verification. The verification result is transmitted to the cloud server 102 as the access token information 406.

After confirming that the access token is valid based on the access token information 406, the cloud server 102 stores the scanned data 404 in the storage of the cloud server 102. After the scanned data 404 is stored, a result notification 512 indicating whether the scanned data 404 is stored in the cloud server 102 is transmitted to the image forming apparatus 101.

Upon receiving the result notification 512, the image forming apparatus 101 transmits a job end notification 513 including the scan processing result based on the scan instruction received from the information processing apparatus 100 to the information processing apparatus 100.

Upon receiving the job end notification 513, the information processing apparatus 100 displays a scan instruction execution result and terminates the scan processing.

A sequence of the scanning system according to the first exemplary embodiment is described above with reference to the sequence diagram of FIG. 5. According to the first exemplary embodiment, the scan instruction including the access token and the address of the cloud server 102 is transmitted from the information processing apparatus 100 to the image forming apparatus 101, thereby enabling direct transmission of scanned data from the image forming apparatus 101 to the cloud server 102. Further, there is no need to store the scanned data in the storage device of the information processing apparatus 100, which leads to a reduction in processing time for the information processing apparatus 100 to execute an application and a reduction in adverse effects on other applications. Furthermore, the image forming apparatus 101 can transmit the scanned data to the cloud server 102 without acquiring the access token. This eliminates the need for the image forming apparatus 101 to display an authentication request and a user authentication screen on the control panel 309 during acquisition of the access token.

<User Interface (UI) Flow of Information Processing Apparatus According to First Exemplary Embodiment>

Figure 6:
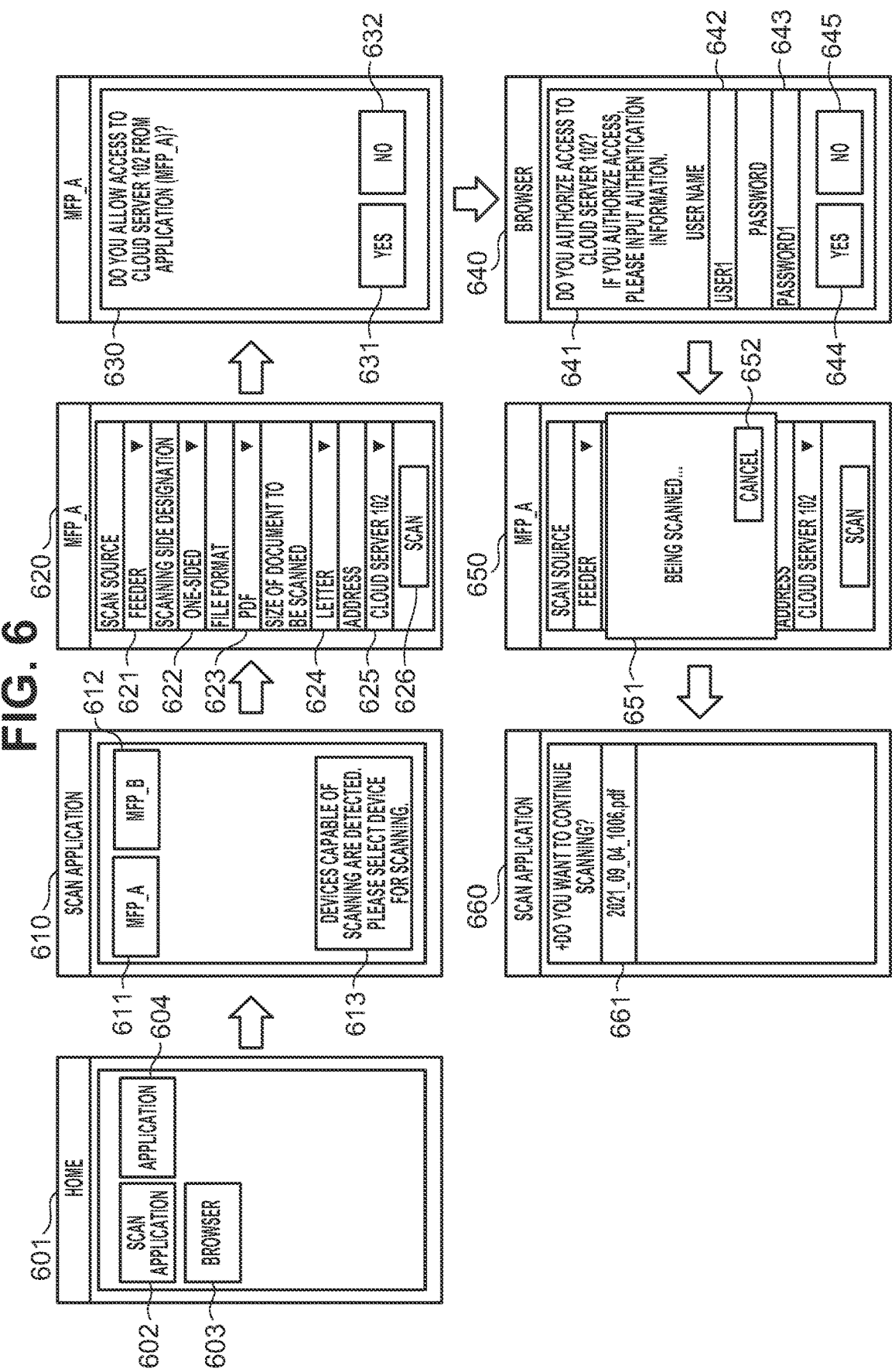
FIG. 6 illustrates a screen transition of an application to be executed in the information processing apparatus according to the first exemplary embodiment.

FIG. 6 is a UI flow diagram illustrating a screen transition when an application is executed in the information processing apparatus 100 according to the first exemplary embodiment. FIG. 6 illustrates a screen transition of the information processing apparatus 100 based on an operation on the touch panel of the control panel 209.

A home screen 601 is a home screen in a state where the application is not activated in the information processing apparatus 100. The home screen 601 displays a scan application 602 to implement the scanning system according to the present exemplary embodiment, other applications 604, and icons to execute a browser 603 to display the Internet and the like.

Upon detecting a touch on the scan application 602, the information processing apparatus 100 executes the scan application 602 and displays a scan application screen 610 on the control panel 209.

The scan application screen 610 displays image forming apparatuses that are detected by the information processing apparatus 100 via the network I/F 306 as MFP_A 611 and MFP_B 612. In the following description, assume that the detected MFP_A 611 corresponds to the image forming apparatus 101.

The scan application screen 610 also displays an explanation screen 613 for the displayed devices. A scan setting screen 620 is displayed by pressing MFP_A 611 on the scan application screen 610.

The scan setting screen 620 is a screen for various settings to execute scanning in the image forming apparatus 101. Before the scan setting screen 620 is displayed, the scan application 602 acquires capability information about the scanner 315 from the image forming apparatus 101, and displays scan settings 621 to 625 based on the capability information. In the scan source setting 621, the user sets one of "book" to scan a document placed on the platen glass and "feeder" to scan a document placed on the ADF. In the scanning side designation 622, the user sets one of "double-sided" scanning of a document and "one-sided" scanning of a document. In the file format setting 623, the user sets a file format for a file to be generated based on image data generated by scanning the document. In the file format setting 623, the user can set file formats such as JPEG, TIFF, and PDF. In the scan document size setting 624, the user sets the size of a document sheet to be scanned in the image forming apparatus 101. In the scan document size setting 624, the user can designate the size of a document to be scanned, such as a letter size, A4-size, and A3-size. The address 625 indicates a setting for designating the address where scanned data is to be transmitted. In the address 625, various cloud servers that are set in the information processing apparatus 100 are displayed as selectable addresses. In the address displayed on the address 625, the URL of the cloud server 102, the name of the cloud server 102, and an icon indicating the cloud server 102, and the like are displayed. In the address 625, the address of the information processing apparatus 100 can also be set. In this case, the image data generated by scanning the document in the image forming apparatus 101 is stored in the storage device 205 of the information processing apparatus 100.

A scan button 626 is a button to set the items 621 to 625 displayed on the scan setting screen 620 in the scan instruction 403 and transmit the scan instruction 403 to the image forming apparatus 101 to cause the image forming apparatus 101 to start scanning.

An authorization screen 630 is a screen to acquire the access token from the authorization server 103 and confirm whether to allow (authorize) the user to access the cloud server 102. When a YES button 631 is pressed, the scan application 602 transmits the authorization request 501 to the authorization server 103.

A browser screen 640 is a screen on which the information processing apparatus 100 displays an authorization screen 641 by switching the application to the browser 603 upon reception of the URI of the authorization screen from the authorization server 103 after the scan application 602 transmits the authorization request 501. A user name and a password are input to a user name item 642 and a password item 643, respectively, on the authorization screen 641. When a YES 644 button is pressed, the browser 603 transmits the input user name and password to the authorization server 103 as a request for the user authentication 503.

After the input user name and password are transmitted, the authorization server 103 transmits the access token to the information processing apparatus 100 through the sequence illustrated in FIG. 5.

Upon receiving the access token, the information processing apparatus 100 transmits the scan instruction including the access token and the address of the cloud server 102 set in the address setting 625 to the image forming apparatus 101. The scan instruction according to the first exemplary embodiment includes scan settings (a scan source, designation of a scan name, a file format, and the size of a document to be scanned) made on the scan setting screen 620, the address, and the format associated with the access token for each address. A scan instruction 1505 illustrated in Table 1 indicates setting items for the scan instruction 1505 and examples of the settings. The items for scan settings in the scan instruction 1505 are displayed based on the scanner capabilities in the image forming apparatus 101. If the scan instruction 1505 includes no scan settings, the scan instruction 1505 may be displayed on the control panel 309 of the image forming apparatus 101 to receive scan settings.

TABLE 1

Scan Instruction 1505

| Setting Category | Setting Item | Settings |
|---|---|---|
| Scan Setting | Scan Source | Book/ADF |
| | Scanning Side Designation | Double-sided/One-sided |
| | File Format | TIFF/JPEG/PDF |
| | Size of Document to be Scanned | A4, Letter, Legal, A3, • • • |
| | Resolution [dpi] | 600 × 600, 150 × 150, • • • |
| | Scan Type | Character, Photograph, Character and Photograph |
| | • • • | • • • |
| Address | Address | First Cloud Server URI (First Access Token) |
| | Address 2 | Second Cloud Server URI (Second Access Token) |
| | Address 3 | Third Cloud Server URI (Third Access Token) |
| | • • • | • • • |

On a status screen 650, the information processing apparatus 100 displays information indicating that document scanning is being executed by the scanner 315 of the image forming apparatus 101. A means for acquiring a scan processing status in the image forming apparatus 101 may be added to the scan application 602 to switch the display to a screen indicating "being transmitted" after the transmission to the cloud server 102 is started.

A cancel button 652 on the status screen 650 is a button to be pressed to interrupt the transmission processing from the image forming apparatus 101 to the cloud server 102. When the transmission processing is interrupted, the scan setting screen 620 is displayed.

On an end screen 660, the information processing apparatus 100 receives the job end notification 513 from the image forming apparatus 101 and displays information indicating that the scan processing ends. The file name of the scanned data stored in the cloud server 102 is displayed on a file name 661. If a plurality of pieces of scanned data is transmitted, the file names of the pieces of scanned data, respectively, are displayed in a list form. If a plurality of addresses is designated, the file names are associated with the addresses, respectively, to be displayed.

A UI flow according to the first exemplary embodiment is described above as a display example on a tablet terminal. According to this UI flow, the scan instruction is issued to the image forming apparatus 101 from the scan application 602 of the information processing apparatus 100, thereby enabling the transmission of scanned data to the cloud server 102 without receiving the scanned data by the scan application 602. Also, in a case where the cloud server 102 is compatible with OAuth 2.0, the scan application 602 can execute user authorization/authentication processing.

<Flowchart for Information Processing Apparatus According to First Exemplary Embodiment>

Figure 7:
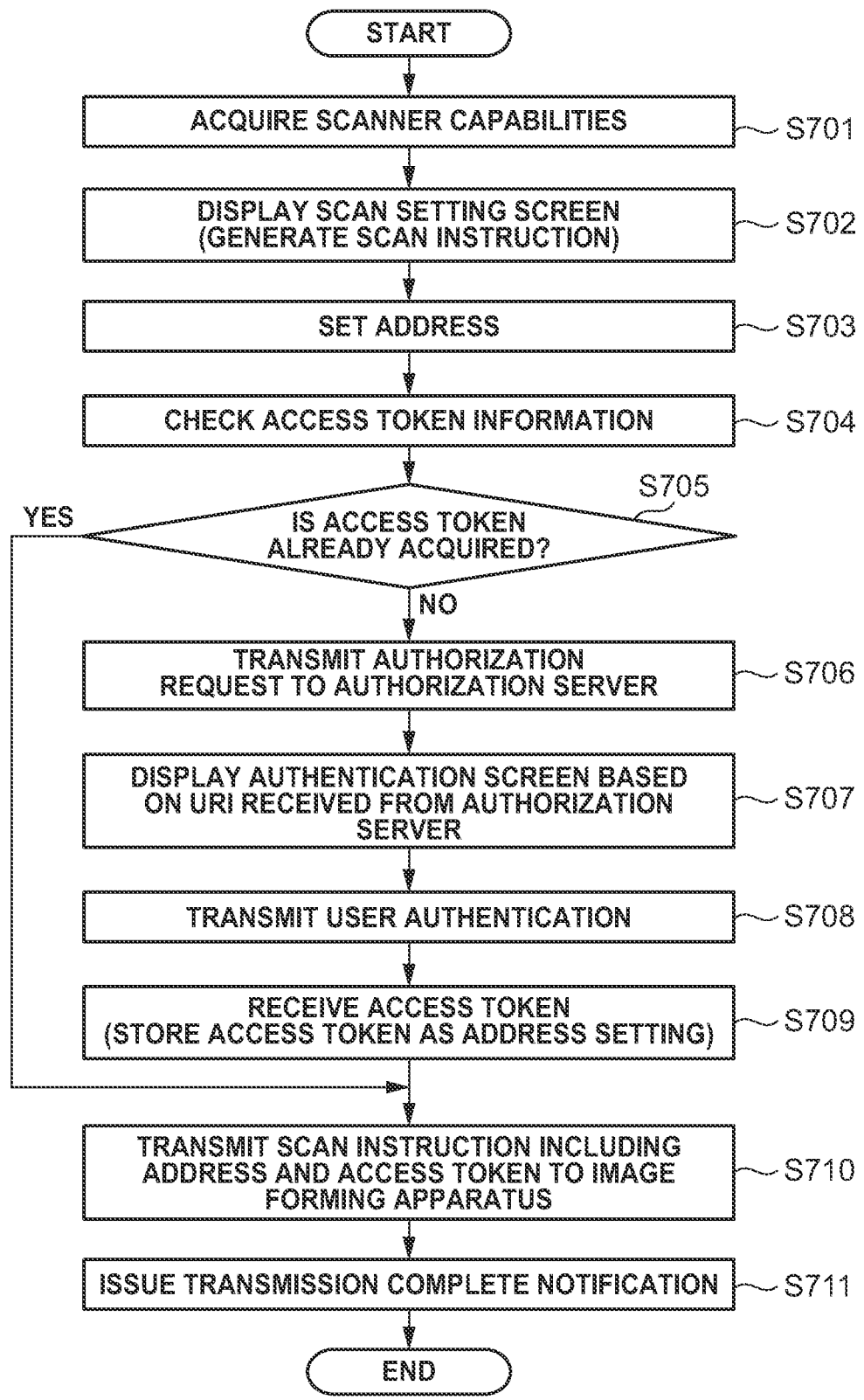
FIG. 7 is a flowchart illustrating processing of the information processing apparatus when an application is executed in the first exemplary embodiment.

FIG. 7 is a flowchart illustrating processing of the information processing apparatus 100 when the scan application 602 (and the browser 603) is executed in the first exemplary embodiment. The scan application 602 and the browser 603 are stored in the storage device 205 of the information processing apparatus 100 and are executed by the CPU 202. The processing illustrated in the flowchart of FIG. 7 is implemented such that the CPU 202 reads out programs stored in the ROM 204 or the storage device 205 into the RAM 203 and executes the programs. In the present exemplary embodiment, the information processing apparatus 100 is controlled by a real-time operating system (OS) and the programs can execute applications in parallel by, for example, interrupt, transmission and reception of a message, event processing, or task switching. This flowchart is started when the scan application 602 is pressed on the home screen 601 illustrated in FIG. 6 and the image forming apparatus 101 (MFP_A611) is selected.

In step S701, the CPU 202 acquires scanner capabilities from the image forming apparatus 101 to display the scan setting screen 620 on the control panel 209. The scanner capabilities indicate capabilities such as scan settings, information indicating whether transmission is possible by address designation, and the number of addresses to which transmission can be made. An inquiry for scanner capabilities is obtained by sending an inquiry to the URI for scanner capabilities of the image forming apparatus 101 by Hyper-Text Transfer Protocol (HTTP) GET method from the information processing apparatus 100 via a network and receiving extended markup language (XML) data obtained during the response.

In step S702, the CPU 202 causes the control panel 209 to display the scan setting screen 620 based on the scanner capabilities obtained in step S701. Then, the CPU 202 receives data input to each item by the user on the scan setting screen 620, and stores the received data in the storage device 205.

The CPU 202 generates the scan instruction 1505 based on the settings that are input by the user and stored in the storage device 205.

In step S703, the CPU 202 loads the setting of the address 625 and sets the address 625 in the scan instruction 1505. If no address is set in the address 625, scan processing is executed by setting the information processing apparatus 100 as a destination of the scan instruction.

In step S704, the CPU 202 checks whether the access token corresponding to the address identical to the address obtained in step S703 is stored in the storage device 205 of the information processing apparatus 100. If the access token corresponding to the same address is stored, the access token is read out from the storage device 205 and both the access token and the address are set in the scan instruction. Further, the CPU 202 sets the access token corresponding to the address 625 to "already acquired". If the access token corresponding to the same address is not stored in the storage device 205, the CPU 202 sets the access token corresponding to the address 625 to "not acquired yet".

In step S705, the CPU 202 checks the access token acquisition status in step S704. If the access token is already acquired (YES in step S705), the processing proceeds to step S710. If the access token is not acquired yet (NO in step S705), the processing proceeds to step S706.

In step S706, the CPU 202 causes the control panel 209 to display the status screen 650 to check whether to allow access to the cloud server 102 to send a request for authorization to the authorization server 103. When pressing of the YES button 631 is detected, the CPU 202 transmits the authorization request to the authorization server 103. If pressing of the NO button 632 is detected, the processing returns to step S702.

In step S707, the CPU 202 causes the control panel 209 to display the authentication screen 502 on which the URI received from the authorization server 103 is displayed. The authentication screen 502 is displayed by the browser 603 on the control panel 209.

In step S708, when the CPU 202 receives the data input to the user name 642 and the password 643 by the user and detects pressing of the YES button 644, the CPU 202 transmits the input user information to the authorization server 103 as the user authentication 503. The processing from the reception of the authorization response 504 to the transmission of the token request 505 is executed based on the sequence illustrated in FIG. 5.

In step S709, the CPU 202 receives the access token issued by the authorization server 103.

In step S710, the scan instruction 1505 including the address, the access token, and the scan settings is transmitted to the image forming apparatus 101. After the scan instruction 1505 is transmitted, the status screen 650 is displayed while the statuses such as the scanning status and the transmission status of the image forming apparatus 101 are acquired.

In step S711, upon receiving the job end notification 513 from the image forming apparatus 101, the information processing apparatus 100 sets the transmitted file name included in the job end notification 513 in the file name 661 and completes the scan processing by the scan application 602.

As described above, in the first exemplary embodiment, the scan application 602 of the information processing apparatus 100 can acquire the access token 402 corresponding to the address from the authorization server 103, thereby eliminating the need for the image forming apparatus 101 to execute processing of acquiring the access token.

Additionally, since there is no need for the information processing apparatus 100 to store scanned data in the storage device 205 of the information processing apparatus 100 during scan processing, the operation of the information processing apparatus 100 has less effect on other applications.

If the information processing apparatus 100 has already acquired the access token corresponding to the address, the scan instruction 1505 can be transmitted to the image forming apparatus 101 without executing the sequence of acquiring the access token.

<Flowchart for Image Forming Apparatus According to First Exemplary Embodiment>

Figure 8:
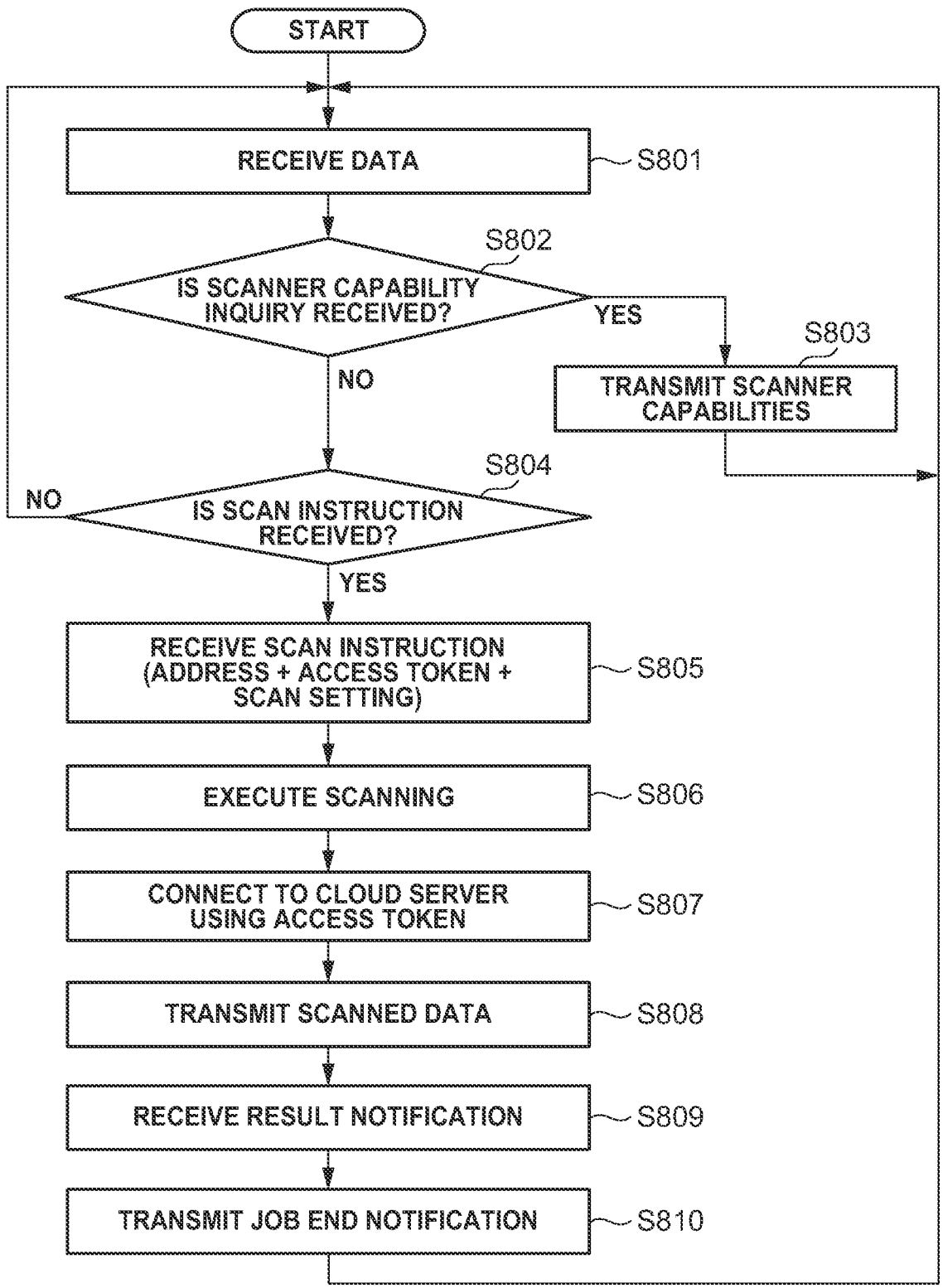
FIG. 8 is a flowchart illustrating a scan processing service for the image forming apparatus according to the first exemplary embodiment.

FIG. 8 is a flowchart illustrating a scan processing service for the image forming apparatus 101 according to the first exemplary embodiment. The scan processing service is a scanner control program for executing scan processing by controlling the image forming apparatus 101 from the scan application 602 in the information processing apparatus 100. This scanner control program is stored in the storage device 305 of the image forming apparatus 101 and is executed by the CPU 302. The processing illustrated in the flowchart of FIG. 8 is implemented such that the CPU 302 reads out programs stored in the ROM 304 or the storage device 305 and executes the programs. In the present exemplary embodiment, the image forming apparatus 101 is controlled by a real-time OS and the programs can execute applications in parallel by, for example, interrupt, transmission and reception of a message, event processing, or task switching.

In step S801, the image forming apparatus 101 receives data in the scan processing service from the information processing apparatus 100 via the network I/F 306. The scan processing service is started when the image forming apparatus 101 is activated and a URI received using an HTTP protocol and Hyper Text Markup Language (HTML) data are analyzed to thereby switch the processing received from the information processing apparatus 100.

In step S802, the CPU 302 determines whether a scanner capability inquiry is received. If it is determined that the scanner capability inquiry is received (YES in step S802), the processing proceeds to step S803. If it is determined that the scanner capability inquiry is not received (NO in step S802), the processing proceeds to step S804.

In step S803, the image forming apparatus 101 transmits scanner capabilities of the image forming apparatus 101 to the information processing apparatus 100 as a response to the scanner capability inquiry. The scanner capabilities indicate information regarding the items (621 to 625) on the scan setting screen 620 displayed by the scan application 602 of the information processing apparatus 100.

In step S804, the CPU 302 determines whether the scan instruction 1505 is received.

If it is determined that the scan instruction 1505 is received (YES in step S804), the processing proceeds to step S805. On the other hand, if it is determined that the scan instruction 1505 is not received yet, the processing returns to step S801.

In step S805, the CPU 302 extracts the scan settings, the address (cloud server 102), and the access token 402 from the received scan instruction 1505, and stores the extracted scan settings, address, and access token 402 into the RAM 303.

In step S806, the CPU 302 controls the scan controller 314 of the image forming apparatus 101 based on the received scan settings to execute scanning of the document placed on the scanner 315, and stores the scanned data as image data in the RAM 303. Further, the CPU 302 converts the image data stored in the RAM 303 into a file of a file format set in the scan setting, and stores the converted image data as the scanned data 404 in the storage device 305.

In step S807, the image forming apparatus 101 connects to the destination cloud server 102 using the received access token 402, and receives a response indicating that the connection is successful. Although not illustrated, if a response indicating that the connection is unsuccessful is received, the job end notification 513 may be issued to indicate that the connection to the destination is unsuccessful.

In step S808, the image forming apparatus 101 transmits the scanned data 404 stored in the storage device 305 to the cloud server 102.

In step S809, the image forming apparatus 101 receives the transmission result from the cloud server 102.

In step S810, the image forming apparatus 101 transmits the job end notification 513 to the information processing apparatus 100, and terminates the scan processing based on the scan instruction 1505 received in step S805. Then, the processing returns to step S801.

The flowchart illustrating the scan processing service for the image forming apparatus 101 in the scanning system according to the present exemplary embodiment is described above. As described above, the scan processing service for the image forming apparatus 101 receives the address and the access token in the scan instruction 403, thereby enabling scanning and transmission to the cloud server 102. The access token acquisition processing is not executed in the image forming apparatus 101, which eliminates the need for, for example, authentication information input processing by the user, access to the authorization server 103, and the like. The address and the access token received in the scan instruction 403 are stored in the storage device 305 of the image forming apparatus 101, thereby enabling the image forming apparatus 101 to execute the transmission to the same cloud server 102 within the expiration period of the access token. Even in a case where the connection to the cloud server 102 has temporarily failed due to some error in network connection, the same data can be retransmitted within the expiration period of the access token. If the access token has expired, the job end notification 513 is transmitted to the information processing apparatus 100, thereby enabling the user to recognize that the scan instruction is unsuccessful.

The scanning system according to the first exemplary embodiment is described above. In the first exemplary embodiment, both the address and the access token acquired by the information processing apparatus 100 are transmitted to the image forming apparatus 101, thereby enabling the transmission of scanned data to the cloud server 102 without storing the scanned data in the storage device 205 of the information processing apparatus 100. This leads to a reduction in processing time from the issuance of the scan instruction to the completion of the transmission. Furthermore, since there is no need to store the scanned data in the storage device 205 of the information processing apparatus 100, the processing load on other applications during execution of the information processing apparatus 100 can be reduced, and thus the user can use the information processing apparatus 100 more comfortably.

Next, a second exemplary embodiment will be described. The configurations of the scanning system, the information processing apparatus 100, and the image forming apparatus 101 according to the second exemplary embodiment are the same as those illustrated in FIGS. 1 to 3, and thus detailed descriptions thereof are omitted.

<Flow of Data of System According to Second Exemplary Embodiment>

Figure 9:
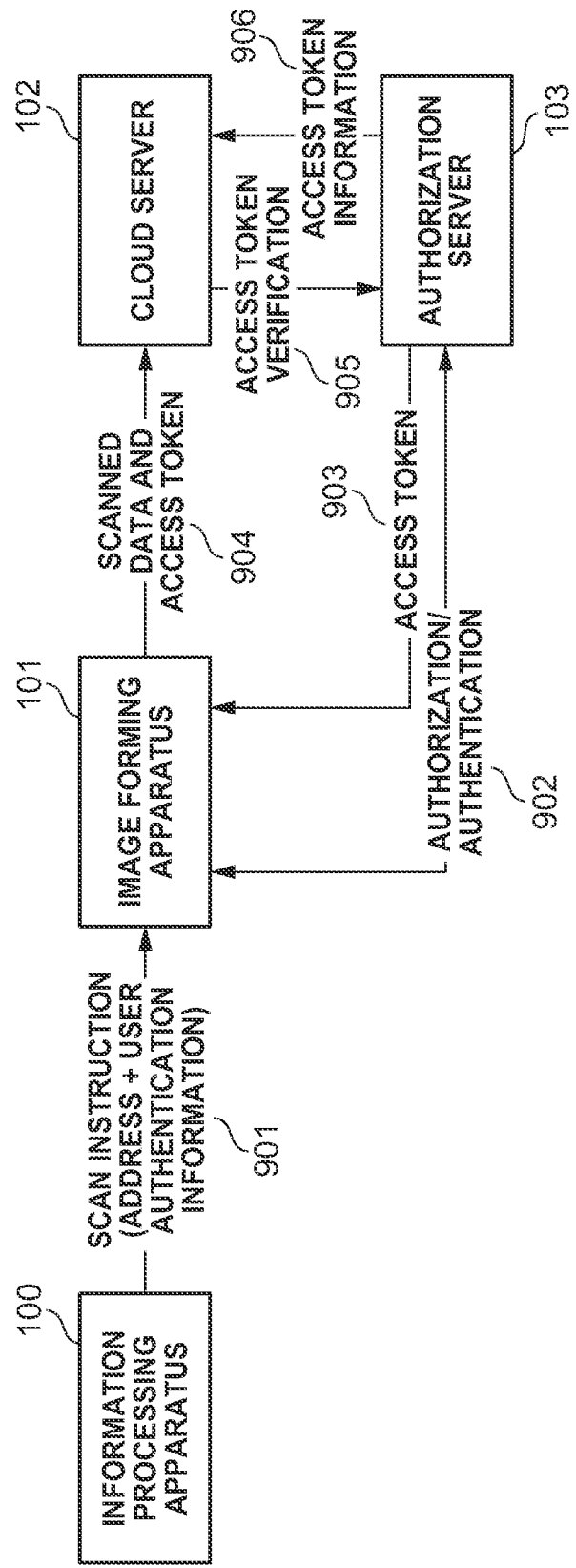
FIG. 9 illustrates a flow of data in a system according to a second exemplary embodiment.

FIG. 9 illustrates a flow of data among the apparatuses constituting the system according to the second exemplary embodiment.

The user activates the scan application in the information processing apparatus 100, and uses the image forming apparatus 101 to issue the scan instruction by setting the cloud server 102 as a destination.

A scan instruction 901 includes a URI indicating the address of the cloud server 102 and user authentication information used to perform authentication in the authorization server 103. A plurality of addresses can also be designated in the scan instruction 901. In this case, user authentication information is set for each address. The present exemplary embodiment illustrates a case where only the cloud server 102 is set as a destination.

Upon receiving the scan instruction 901, the image forming apparatus 101 transmits an authorization/authentication 902 to the authorization server 103 from the image forming apparatus 101 before scanning is executed. The authorization/authentication 902 indicates processing of transmitting, to the authorization server 103, an authorization request and user authentication information in the scan instruction 901 on an authorization screen received based on the authorization request. This processing will be described in detail with reference to a sequence diagram illustrated in FIG. 10. The authorization server 103 processes the authorization/authentication 902 to issue an access token 903 to allow the image forming apparatus 101 to access the cloud server 102, and transmits the access token 903 to the image forming apparatus 101. When the image forming apparatus 101 receives the access token 903, the scanner 315 of the image forming apparatus 101 scans a document and generates scanned data 904. The image forming apparatus 101 transmits, to the cloud server 102, the scanned data 904 to which the access token 903 is added.

The cloud server 102 transmits a request for an access token verification 905 to the authorization server 103, like in the first exemplary embodiment.

The authorization server 103 stores the access token verification result as access token information 906, and transmits the access token information 906 to the cloud server 102, like in the first exemplary embodiment.

Upon receiving the access token information 906, the cloud server 102 determines whether the access token 903 for the scanned data 904 is valid. If it is determined that the access token 903 is valid, the cloud server 102 stores the received image data at the designated address.

A flow of data when the scanning system according to the second exemplary embodiment transmits the scanned data 904 obtained by scanning a document using the image forming apparatus 101 from the information processing apparatus 100 to the cloud server 102 and stores the scanned data 904 is described above.

<Sequence Diagram of System According to Second Exemplary Embodiment>

Figure 10:
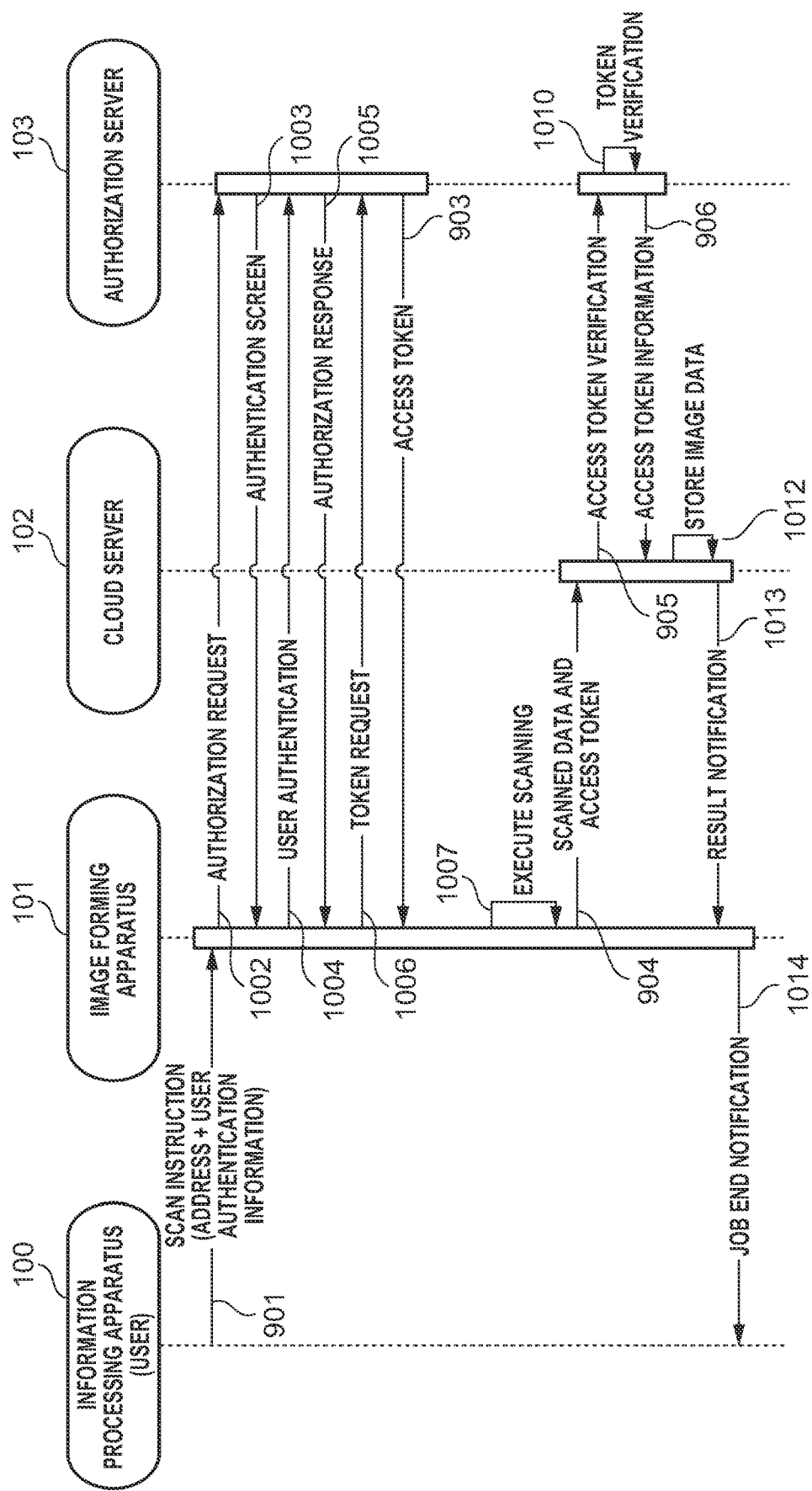
FIG. 10 is a sequence diagram of the system according to the second exemplary embodiment.

FIG. 10 is a sequence diagram illustrating the scanning system according to the second exemplary embodiment.

FIG. 10 illustrates a sequence when scanning is started by an application in the scanning system according to the second exemplary embodiment, like in the first exemplary embodiment.

The information processing apparatus 100 transmits the scan instruction 901 including the address and authentication information (user name and password) designated on the application to the image forming apparatus 101.

The image forming apparatus 101 transmits an authorization request 1002 from the image forming apparatus 101 to the authorization server 103 to obtain an access authorization to the cloud server 102.

The authorization server 103 determines the received authorization request 1002, and transmits a URI for displaying an authentication screen 1003 to the image forming apparatus 101. The image forming apparatus 101 displays the authentication screen 1003 on the browser of the image forming apparatus 101. When the user inputs authentication information, the image forming apparatus 101 transmits the authentication information to the authorization server 103 as a user authentication 1004. The authorization server 103 determines the authentication information on the user authentication 1004. If the authentication is successful, the access token 903 is transmitted to the image forming apparatus 101.

After the image forming apparatus 101 receives the access token 903, the scanner 315 of the image forming apparatus 101 executes scanning 1007 to generate scanned data. After the scanned data is generated, the image forming apparatus 101 transmits the access token 903 and the scanned data as the scanned data 904 to the cloud server 102.

Upon receiving the scanned data 904, the cloud server 102 transmits the access token verification 905 including the access token 903 to the authorization server 103 to verify the access token 903 for the scanned data 904. The authorization server 103 checks whether the access token 903 included in the received access token verification 905 is issued, and if the access token 903 is issued, the authorization server 103 checks the expiration period and the expired state of the access token 903 in token verification 1010. The verification result is transmitted to the cloud server 102 as the access token information 906.

After checking the validity of the access token 903 based on the access token information 906, the cloud server 102 stores the scanned data 904 into the storage of the cloud server 102 in image data storage 1012.

The cloud server 102 transmits a result notification 1013 indicating whether the scanned data 904 is stored in the cloud server 102 to the image forming apparatus 101.

Upon receiving the result notification 1013, the image forming apparatus 101 transmits a job end notification 1014 including the result of scan processing based on the scan instruction 901 received from the information processing apparatus 100 to the information processing apparatus 100.

Upon receiving the job end notification 514, the information processing apparatus 100 displays the execution result of the scan instruction 901 and terminates the scan processing.

A sequence of the scanning system according to the second exemplary embodiment is described above with reference to the sequence diagram of FIG. 10. In the second exemplary embodiment, the scan instruction 901 including the address of the cloud server 102 and the authentication information about the cloud server 102 is issued to the image forming apparatus 101 from the information processing apparatus 100, thereby enabling direct transmission of the scanned data 904 to the cloud server 102 from the image forming apparatus 101. Furthermore, there is need to store the scanned data 904 in the storage device 205 of the information processing apparatus 100, which leads to a reduction in processing time for the information processing apparatus 100 to execute an application and a reduction in adverse effects on other applications.

<UI Flow of Information Processing Apparatus According to Second Exemplary Embodiment>

Figure 11:
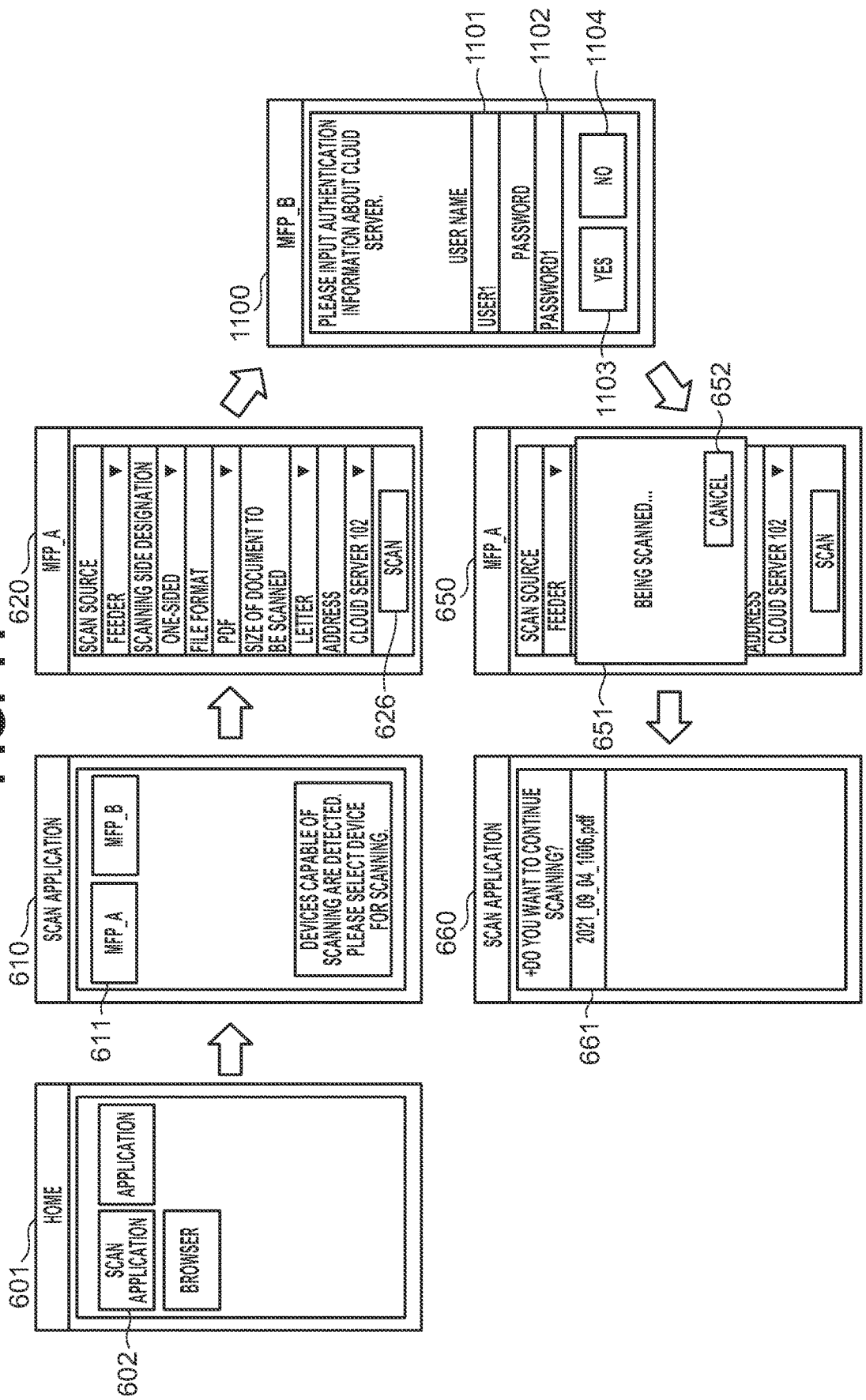
FIG. 11 illustrates a screen transition of an application to be executed in an information processing apparatus according to the second exemplary embodiment.

FIG. 11 is a UI flow diagram illustrating a screen transition when an application is executed in the information processing apparatus 100 according to the second exemplary embodiment. The UI flow diagram according to the second exemplary embodiment differs from the UI flow diagram according to the first exemplary embodiment illustrated in FIG. 6 in that the authorization screen 630 is not displayed and an authentication screen 1100 on which authentication information is input is displayed by the scan application 602.

As described above with reference to FIG. 6, the icon corresponding to the scan application 602 is pressed on the home screen 601 to thereby activate the scan application 602, and the scan application screen 610 is displayed. Further, MFP_A611 displayed on the scan application screen 610 is pressed to display the scan setting screen 620, and the scan button 626 is pressed to start scan processing on the image forming apparatus 101. After the scan button 626 is pressed, in the second exemplary embodiment, the scan application 602 displays the authentication screen 1100 as a screen to input authentication information about the destination cloud server 102. The authentication screen 1100 is substantially the same as the authorization screen 630 displayed on the browser 603. Input items of user name 1101 and password 1102 are parameters to be set in the scan instruction 901.

If a YES button 1103 is pressed on the authentication screen 1100, the information processing apparatus 100 transmits the scan instruction 901 to the image forming apparatus 101 and displays the status screen 650, like in FIG. 6.

When a NO button 1104 is pressed, the display is returned to the scan setting screen 620.

Table 2 illustrates an example of setting items for the scan instruction 901 and examples of the settings.

TABLE 2

Scan Instruction 901

| Setting Category | Setting Item | Settings |
|---|---|---|
| Scan Setting | Scan Source | Book/ADF |
| | Scanning Side Designation | Double-sided/One-sided |
| | File Format | TIFF/JPEG/PDF |
| | Size of Document to be Scanned | A4, Letter, Legal, A3, • • • |
| | Resolution [dpi] | 600 × 600, 150 × 150, • • • |
| | Scan Type | Character, Photograph, Character and Photograph |
| | • • • | • • • |
| Address | Address | First Cloud Server URI (First Authentication Information) |
| | Address 2 | Second Cloud Server URI (Second Authentication Information) |
| | Address 3 | Third Cloud Server URI (Third Authentication Information) |
| | • • • | • • • |

Even in a state where the scan instruction 901 includes no scan settings, the image forming apparatus 101 may display scan settings on the control panel 309 of the image forming apparatus 101 upon reception of the scan instruction 901, and may control scanning to be executed. Further, the image forming apparatus 101 may provide default scan settings by the scan application 602, and if there are no scan settings, scanning may be executed based on the default settings.

After the scan instruction 901 is transmitted, the scan application 602 displays the status screen 650, like in FIG. 6, and also displays the end screen 660 after completion of the scan processing by the image forming apparatus 101.

The UI flow according to the second exemplary embodiment is described above as a display example on a tablet terminal. While the first exemplary embodiment illustrates an example where the authorization screen 630 and the browser screen 640 are displayed based on OAuth 2.0, the second exemplary embodiment illustrates an example where scanned data can be transmitted from the image forming apparatus 101 to the cloud server 102 without displaying the authorization screen 630 and the browser screen 640. This eliminates the need for processing of acquiring an access token and processing of holding an access token for each address, which leads to a reduction in load on the memory and storage for the scan application of the information processing apparatus 100. Consequently, the user can execute the scan application more comfortably.

<Flowchart for Information Processing Apparatus According to Second Exemplary Embodiment>

Figure 12:
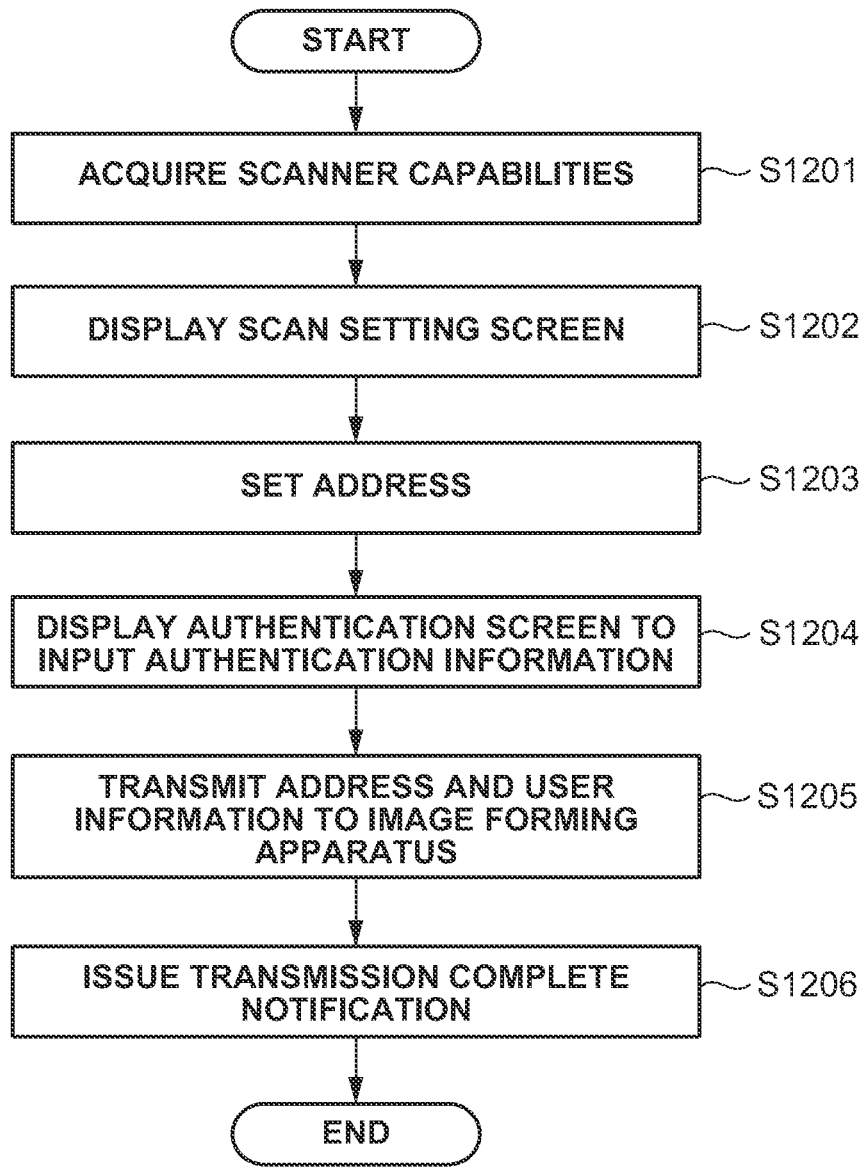
FIG. 12 is a flowchart illustrating processing of the information processing apparatus when an application is executed in the second exemplary embodiment.

FIG. 12 is a flowchart illustrating processing of the information processing apparatus 100 when the scan application 602 is executed in the second exemplary embodiment. The scan application 602 is stored in the storage device 205 of the information processing apparatus 100, and is executed by the CPU 202. The processing illustrated in the flowchart of FIG. 12 is implemented such that the CPU 202 reads out programs stored in the ROM 204 or the storage device 205 into the RAM 203 and executes the programs. In the present exemplary embodiment, the information processing apparatus 100 is controlled by a real-time OS and the programs can execute applications in parallel by, for example, interrupt, transmission and reception of a message, event processing, or task switching. This flowchart is started when the scan application 602 is pressed on the home screen 601 illustrated in FIG. 11.

In step S1201, the CPU 202 acquires scanner capabilities from the image forming apparatus 101 to display the scan setting screen 620. The scanner capabilities indicate capabilities such as scan settings, information indicating whether transmission is possible by address designation, and the number of addresses to which transmission can be made. A scanner capability inquiry is obtained by sending an inquiry to the URI for scanner capabilities of the image forming apparatus 101 by HTTP GET method from the information processing apparatus 100 via a network and receiving a response to the inquiry.

In step S1202, the CPU 202 displays the scan setting screen 620 based on the scanner capabilities obtained in step S1201, receives data input to each item by the user on the scan setting screen 620, and generates the scan instruction 1505.

In step S1203, the CPU 202 loads the setting of the address 625 and sets the address 625 in the scan instruction 901. If no address is set in the address 625, scan processing is executed by setting the information processing apparatus 100 as a designation of the scan instruction 1505.

In step S1204, the CPU 202 displays the authentication screen 1100 and receives input of authentication information corresponding to the address designated in step S1203.

In step S1205, the information processing apparatus 100 transmits the scan instruction 901 including the address, the authentication information, and the scan settings to the image forming apparatus 101. After the scan instruction 901 is transmitted, the status screen 650 is displayed while the statuses such as the scanning status and the transmission status of the image forming apparatus 101 are acquired.

In step S1206, upon receiving the job end notification 1014 from the image forming apparatus 101, the CPU 202 sets the transmitted file name included in the job end notification 1014 in the file name 661 and completes the scan processing by the scan application 602.

As described above, in the second exemplary embodiment, the information processing apparatus 100 sends the scan instruction including the authentication information and the address to the image forming apparatus 101, thereby enabling the information processing apparatus 100 to issue the scan instruction without performing authentication/authorization processing. Furthermore, since there is no need for the information processing apparatus 100 to store the scan data in the storage device 205 during scan processing, the operation of the information processing apparatus 100 has less effect on other applications.

<Flowchart for Image Forming Apparatus According to Second Exemplary Embodiment>

Figure 13:
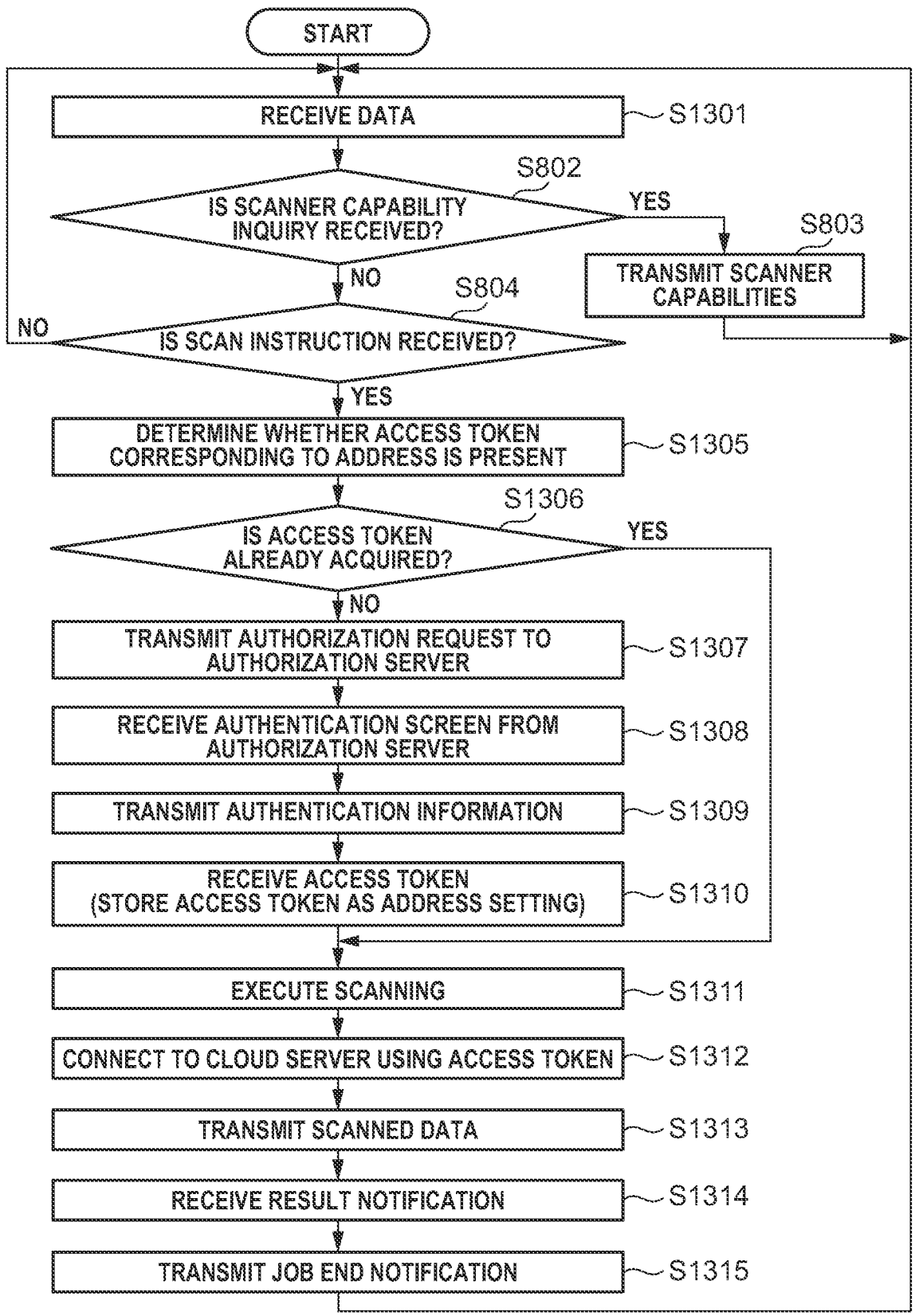
FIG. 13 is a flowchart illustrating a scan processing service for an image forming apparatus according to the second exemplary embodiment.

FIG. 13 is a flowchart illustrating a scan processing service for the image forming apparatus 101 according to the second exemplary embodiment. The scan processing service according to the second exemplary embodiment is also a scanner control program for controlling the image forming apparatus 101 from the scan application 602 of the information processing apparatus 100 to execute scan processing, like in FIG. 8. The processing illustrated in the flowchart of FIG. 13 is implemented such that the CPU 302 reads out programs stored in the ROM 304 or the storage device 305 into the RAM 303 and executes the programs.

Steps S1301 to S804 respectively correspond to steps S801 to S804 in the first exemplary embodiment, and thus the detailed descriptions thereof are omitted. In step S803, a capability notification indicating scanner capabilities may be issued based on OAuth 2.0, to thereby provide a notification indicating that the scan processing service according to the second exemplary embodiment is available.

In step S804, if the CPU 302 receives the scan instruction 901 (YES in step S804), the processing proceeds to step S1305, and if the CPU 302 does not receive the scan instruction 901 (NO in step S804), the processing returns to step S1301.

In step S1305, the CPU 302 stores the scan settings, the address, and the authentication information in the received scan instruction 901 into the RAM 303. Further, the CPU 302 determines whether the access token 903 corresponding to the stored address is already acquired and stored in the storage device 305.

In step S1306, if the CPU 302 has already acquired the access token (YES in step S1306), the processing proceeds to step S1311. If the CPU 302 has not acquired the access token (NO in step S1306), the processing proceeds to step S1307.

In step S1307, the image forming apparatus 101 transmits the authorization request 1002 to the authorization server 103.

In step S1308, the image forming apparatus 101 receives the authentication screen 1003 from the authorization server 103.

In step S1309, the image forming apparatus 101 sets the authentication information stored in the RAM 303 from the scan instruction 901 in the response to the authentication screen 1003 received from the authorization server 103, and transmits the authentication information.

In step S1310, the image forming apparatus 101 receives an authorization response 1005, and transmits an authorization code for the received authorization response 1005 to the authorization server 103 as a token request 1006. The CPU 302 receives the access token 903 from the authorization server 103 and stores the address and the access token as the access token corresponding to the address included in the scan instruction 901 into the storage device 305.

In step S1311, the CPU 302 controls the scan controller 314 of the image forming apparatus 101 based on the received scan settings, thereby causing the scanner 315 to execute scanning of the document placed on the scanner 315. The CPU 302 stores image data generated by scanning the document into the RAM 303. Further, the CPU 302 converts the image data stored in the RAM 303 into a file of a file format set in the received scan settings, and stores the converted image data as the scanned data 904 into the storage device 305.

In step S1312, the CPU 302 connects to the destination cloud server 102 using the received access token 903, and receives a response indicating that the connection is successful. If a response indicating that the connection is unsuccessful is received, the processing proceeds to step S1315 to issue the job end notification 1014 to indicate that the connection to the destination is unsuccessful (not illustrated).

In step S1313, the image forming apparatus 101 transmits the scanned data 904 stored in the storage device 305 to the cloud server 102.

In step S1314, the image forming apparatus 101 receives the result notification 1013 from the cloud server 102.

In step S1315, the image forming apparatus 101 transmits the job end notification 1014 to the information processing apparatus 100 to terminate the scan processing based on the scan instruction 901 received in step S1301, and then the processing returns to step S1301.

The flowchart of the scan processing service for the image forming apparatus 101 according to the second exemplary embodiment is described above. As described above, the image forming apparatus 101 receives the address and the authentication information in the scan instruction, thereby enabling the transmission of the scan instruction to the cloud server 102.

In addition, the address received in the scan instruction 901 and the received access token 903 are associated and stored in the storage device 305, thereby enabling the image forming apparatus 101 to execute the transmission of data to the same cloud server 102 within the expiration period of the access token. Even if the connection to the cloud server 102 has temporarily failed due to some error in network connection, the same data can be retransmitted within the expiration period of the access token. If the access token has expired, the job end notification 1014 is transmitted to the information processing apparatus 100, thereby enabling the user to recognize that the scan instruction is unsuccessful due to the expiration of the access token.

The scanning system according to the second exemplary embodiment of the present disclosure is described above. The scanning system according to the second exemplary embodiment described above is a system in which the authentication information and the address are transmitted together from the information processing apparatus 100 to the image forming apparatus 101. In this scanning system, scanned data can be transmitted to the cloud server 102 without the need for storing the scanned data in the storage device 205 of the information processing apparatus 100. Since there is no need to store the scanned data in the storage device 205 of the information processing apparatus 100, the processing load on other applications during execution of the scan application 602 in the information processing apparatus 100 can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-202186, filed Dec. 14, 2021, which is hereby incorporated by reference herein in its entirety.

What is claimed is:

1. A scanning system comprising:
an information processing apparatus;
an image forming apparatus configured to generate image data by scanning a document;
an authorization server configured to issue an access token to access a cloud server; and
a cloud server configured to provide a cloud service,
wherein the information processing apparatus includes a processor that causes the information processing apparatus to function as:
an acquisition unit configured to acquire the access token from the authorization server; and
a first transmission unit configured to transmit the access token and an address of the cloud server to the image forming apparatus, and
wherein the image forming apparatus includes:
a reception unit configured to receive the address and the access token transmitted from the first transmission unit;
a scanning unit configured to scan a document based on the reception of the address and the access token by the reception unit; and
a second transmission unit configured to transmit the access token and image data generated by scanning the document by the scanning unit to the cloud server.

2. The scanning system according to claim 1, wherein the processor causes the information processing apparatus to further function as:
an acceptance unit configured to accept capability information about the image forming apparatus; and
a determination unit configured to determine whether the image forming apparatus includes a function for acquiring an access token to access the cloud server based on the capability information accepted by the acceptance unit,
wherein, in a case where the determination unit determines that the image forming apparatus does not include the function for acquiring the access token to access the cloud server based on the capability information accepted by the acceptance unit, the acquisition unit acquires the access token from the authorization server.

3. The scanning system according to claim 1,
wherein the image forming apparatus further includes a storage configured to store the access token acquired by the acquisition unit and an address, and
wherein, in a case where an address identical to the address of the cloud server acquired from the authorization server is already received, the second transmission unit transmits the image data to the cloud server using the access token corresponding to the address of the cloud service, the access token being stored in the storage.

4. The scanning system according to claim 1, wherein the acquisition unit acquires the access token from the authorization server as a response to user information transmitted to the information processing apparatus.

5. A scanning system comprising:
an information processing apparatus;
an image forming apparatus configured to generate image data by scanning a document;

an authorization server configured to issue an access token to access a cloud server; and a cloud server configured to provide a cloud service, wherein the information processing apparatus includes a processor that causes the information processing apparatus to function as:

a first transmission unit configured to transmit authentication information for access to the cloud server and an address of the cloud server to the image forming apparatus, and wherein the image forming apparatus includes a processor that causes the image forming apparatus to function as:

a reception unit configured to receive the authentication information and the address of the cloud server transmitted from the first transmission unit;

an acquisition unit configured to acquire, from the authorization server, the access token to access to the cloud server indicated by the authentication information and the address received by the reception unit; and a second transmission unit configured to transmit the access token acquired by the acquisition unit and the image data to the cloud server.

6. The scanning system according to claim 5, wherein the processor of the information processing apparatus causes the information processing apparatus to further function as:

an acceptance unit configured to accept capability information about the image forming apparatus; and a determination unit configured to determine whether the image forming apparatus includes a function for acquiring an access token to access the cloud server based on the capability information accepted by the acceptance unit, and wherein, in a case where the determination unit determines that the image forming apparatus includes the function for acquiring the access token to access the cloud server, the first transmission unit transmits the authentication information for access to the cloud server and the address of the cloud server to the image forming apparatus.

7. The scanning system according to claim 5, wherein the image forming apparatus further includes a storage configured to store the access token acquired from the authorization server and the address of the cloud server, and wherein, in a case where an address identical to the address of the cloud server acquired from the information processing apparatus is already received, the image forming apparatus transmits the image data to the cloud server using the access token stored in the storage.

8. The scanning system according to claim 7, wherein, in a case where the access token stored in the storage is already present, the second transmission unit transmits the image data to the cloud server using the access token stored in the storage.

9. A control method for a scanning system, the scanning system including an information processing apparatus, an image forming apparatus configured to generate image data by scanning a document, an authorization server configured to issue an access token to access a cloud server, and a cloud server configured to provide a cloud service, the control method comprising:

acquiring, by the information processing apparatus, the access token from the authorization server;

transmitting, by the information processing apparatus, the access token and an address of the cloud server in a first transmission;

receiving, by the image forming apparatus, the address and the access token transmitted in the first transmission;

scanning, by the image forming apparatus, a document based on the reception of the address and the access token; and transmitting, by the image forming apparatus, the image data generated by scanning the document and the access token to the cloud server in a second transmission.

10. A control method for a scanning system, the scanning system including an information processing apparatus, an image forming apparatus configured to generate image data by scanning a document, an authorization server configured to issue an access token to access a cloud server, and a cloud server configured to provide a cloud service, the control method comprising:

transmitting, by the information processing apparatus, authentication information for access to the cloud server and an address of the cloud server to the image forming apparatus in a first transmission;

receiving, by the image forming apparatus, the authentication information and the address of the cloud server transmitted in the first transmission;

acquiring, from the authorization server, the access token to access the cloud server indicated by the authentication information and the address received; and transmitting the acquired access token and the image data to the cloud server in a second transmission.

* * * * *